(12) United States Patent
Patience et al.

(10) Patent No.: US 6,833,547 B2
(45) Date of Patent: Dec. 21, 2004

(54) AMBIENT-TO-COLD FOCUS AND ALIGNMENT OF CRYOGENIC SPACE SENSORS USING UNCOOLED AUXILLARY DETECTORS

(75) Inventors: Roy A. Patience, Thousand Oaks, CA (US); Larry L. Cunningham, Redondo Beach, CA (US); Ray D. Kroll, Alta Loma, CA (US); Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 103 days.

(21) Appl. No.: 10/171,956

(22) Filed: Jun. 14, 2002

(65) Prior Publication Data

US 2003/0230722 A1 Dec. 18, 2003

(51) Int. Cl.[7] ................................................... H01J 5/02
(52) U.S. Cl. ........................................ 250/352; 250/332
(58) Field of Search ........................................... 250/352

(56) References Cited

U.S. PATENT DOCUMENTS

| 5,149,970 | A | | 9/1992 | Whitney |
| 5,391,875 | A | | 2/1995 | Cederberg et al. |
| 5,600,143 | A | * | 2/1997 | Roberts et al. ............. 250/349 |
| 6,137,107 | A | * | 10/2000 | Hanson et al. ............. 250/332 |
| 6,583,416 | B1 | * | 6/2003 | Villani ........................ 250/332 |

FOREIGN PATENT DOCUMENTS

WO    WO 02 25741 A    3/2002

* cited by examiner

Primary Examiner—John R. Lee
Assistant Examiner—Phillip A Johnston
(74) Attorney, Agent, or Firm—John E. Gunther; Leonard A. Alkov; William C. Schubert

(57) ABSTRACT

A system and method for focusing infrared detectors operable at cryogenic temperatures. The invention includes a sensor (10) for detecting electromagnetic energy comprising a first detector (14) operable over a first temperature range and a predetermined number of auxiliary detectors (12) operable over a second temperature range, wherein the auxiliary detectors (12) are adjacent to and in the same optical plane as the first detector (14). In the illustrative embodiment, the energy is infrared or visible light, the first temperature range is a range of cryogenic temperatures, and the second temperature range is a range of ambient temperatures. The first detector (14) is a focal plane array and the auxiliary detectors (12) are uncooled detector arrays. In the preferred embodiment, the focal plane array (14) and the uncooled detectors (12) are disposed on a common substrate. In accordance with the teachings of the present invention, the novel sensor (10) can be used to focus an optical system at cryogenic temperatures. The inventive method includes illuminating energy onto the sensor (10) through the optical system at ambient temperatures and then adjusting the position of the sensor (10) until maximum illumination is received by the auxiliary detectors (12). This determines the location of the focal plane of the system at ambient temperatures. The location of the focal plane at cryogenic temperatures can then be calculated using the location of the focal plane at ambient and a model of the thermal characteristics of the system.

16 Claims, 3 Drawing Sheets

AMBIENT-TO-COLD FOCUS AND ALIGNMENT OF CRYOGENIC SPACE SENSORS USING UNCOOLED AUXILIARY DETECTORS

BACKGROUND OF THE INVENTION

1. Field of the Invention

The present invention relates to infrared sensors. More specifically, the present invention relates to systems and methods for focusing and aligning infrared detectors at cryogenic temperatures.

2. Description of the Related Art

Infrared space sensors are used in many acquisition and tracking applications such as remote sensing, weapons guidance, and target tracking. These systems need to operate at cryogenic temperatures (150° K to 20° K). Unfortunately, the process of focusing and aligning infrared detectors at these low temperatures is presently a complex and extremely expensive operation.

The ability to focus and align the detectors at cryogenic temperatures is seriously affected by thermal shift in any substrate material used to house the detectors. The very low temperatures at which these sensors operate produce contractive forces on the optical path which are difficult or impossible to simulate using traditional optical design programs. The shrinkage problem manifests itself as a focus problem with the infrared imaging systems.

Infrared detectors operating in the 3–12 $\mu$m range—including short wave, medium wave, long wave, and visible radiation—often have a very tight focusing requirement. If the sensors are not focused properly, i.e. the set of detectors—generally a detector array or focal plane array (FPA)—are located off of the focal plane, then the output image will be blurred, resulting in a loss of effectivity of the entire system. Focusing an imaging system generally includes either adjusting the optical elements in order to move the point of focus (focal plane) onto the detectors, or moving the detectors into the point of focus established by the fixed optical elements. For many applications, it is more desirable from an engineering perspective to move the detectors rather than the optics.

The infrared detectors presently being used for space applications are operable only at cryogenic temperatures. They do not function and therefore cannot be focused under ambient conditions. Furthermore, space sensors typically do not incorporate moving focus adjust mechanisms due to risk issues. Hence, the focus cannot be adjusted after the sensor is deployed into space. The correct location of the focal plane under space conditions must be determined on earth, and the detectors fixed to that location prior to deployment.

Current focusing procedures involve cycles of manually adjusting the detectors at ambient temperatures followed by performing a focus check at cryogenic temperatures to determine the accuracy of the focus. The focus is measured by placing the sensors in a thermal vacuum chamber where the solar loads and radiative heat losses of space are simulated. These tests typically require large support teams (typically over 30 people) working 7 days a week, 24 hours a day for two to four weeks. Between outgasing and thermal equalization, it can take over a week to just be prepared to perform a focus test. Once the proper test conditions are achieved, the focus of the infrared sensors is measured using modulation transfer techniques or other methods.

In general, the detectors are not properly focused during the first focus test. Since space sensors typically do not incorporate moving mechanisms, the focus can only be measured, not adjusted. Hence, the data from the test must be used to guide the manual realignment of the detectors once the sensor has been brought back to room temperature. With the sensor at room temperature, the manual realignment begins with using the focus data to build a set of mechanical metallic shims. The sensor is disassembled to expose the focal planes and each focal plane is individually shimmed to the calculated focus point. The sensor is reassembled and the multi-layered insulation (MLI) reinstalled. The sensor is then placed back into the vacuum chamber for a second focus check. This cycle of adjusting the detectors tinder ambient conditions followed by checking the focus under cryogenic conditions is repeated until the system is focused. It is typical that 3 to 5 of these focus cycles may be necessary to achieve the required focus of infrared systems at the correct conditions.

Making the problem even more difficult is the fact that each sensor is typically covered with multi-layered insulation (MLI). The MLI has a strong relationship with the thermal performance of the sensor. Each time the detectors are readjusted, the MLI must be altered and removed. This adds variability to the focus response and hence lessens the chances of achieving an optimal focus of the optical train.

Consequently, conventional focusing procedures are time-consuming (on the order of several weeks) and are quite expensive.

Hence, a need exists in the art for an improved system or method for focusing infrared detectors operable at cryogenic temperatures which is less expensive than current conventional approaches.

SUMMARY OF THE INVENTION

The need in the art is addressed by the system and method for focusing infrared detectors operable at cryogenic temperatures of the present invention. The invention includes a sensor for detecting electromagnetic energy comprising a first detector operable over a first temperature range and a predetermined number of auxiliary detectors operable over a second temperature range, wherein the auxiliary detectors are mounted in the same optical plane as the first detector.

In the illustrative embodiment, the energy is infrared or visible light, the first temperature range is a range of cryogenic temperatures, and the second temperature range is a range of ambient temperatures. The first detector is a focal plane array and the auxiliary detectors are uncooled detector arrays. In the preferred embodiment, the focal plane array and the uncooled detectors are disposed on a common substrate.

In accordance with the teachings of the present invention, the novel sensor can be used to focus an optical system at cryogenic temperatures. The inventive method includes illuminating energy onto the sensor through the optical system at ambient temperatures and then adjusting the position of the sensor until maximum illumination is received by the auxiliary detectors. This determines the location of the focal plane of the system at ambient temperatures. The location of the focal plane at cryogenic temperatures can then be calculated using the location of the focal plane at ambient and a model of the thermal characteristics of the system.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

An objective of the present invention is to provide a system and a method effective to reduce the number of focus cycles (each cycle consisting of adjusting the detectors in ambient and checking the resultant focus in vacuum) from the 3–5 typically required using conventional approaches to one. In other words, it is an objective of the present invention to provide a system or method for accurately predicting the location of the focal plane under cryogenic conditions and verifying the focus in a single vacuum chamber focus test.

In accordance with the teachings of the present invention, detectors operable at ambient conditions are placed on the sensor chip assembly (SCA) near the detector array (also called a focal plane array or FPA) which is operable at cryogenic conditions. The ambient detectors should be located in the same optical plane as the FPA. The ambient detectors, or Uncooled Focus Detectors (UFDs), are used to focus the system in order to determine the focus point under ambient conditions. Focusing involves illuminating the detectors with a spot beam and maneuvering the entire SCA in roll, pitch, and yaw until maximum illumination is received by the detectors.

Because of the thermal shifts in the substrate material used to house the detectors, the focus point will shift once the system is in cryogenic temperatures. These thermal shifts, however, can be predicted based on the known physics of the system. The ambient focus point (as determined by the UFDs) is used in combination with the predicted thermal shifts to accurately predict the focus point of the system in cryogenic conditions.

Once cold, the UFDs are no longer used, and the FPA acts as the active detector. The UFDs are used only to assist in the focusing of the FPA. After the FPA is properly focused, the UFDs may be removed or left on the sensor chip assembly, as is recommended.

In the event that the thermal model of the system is inaccurate, resulting in an incorrect focus at the first cryogenic focus check, the thermal variations that affect focus can be more easily derived since the ambient focus point is now known. Long-term estimates are that after this procedure is done a few times, enough data would be collected such that subsequent sensors could be focused in 1 cycle.

Figure 1:
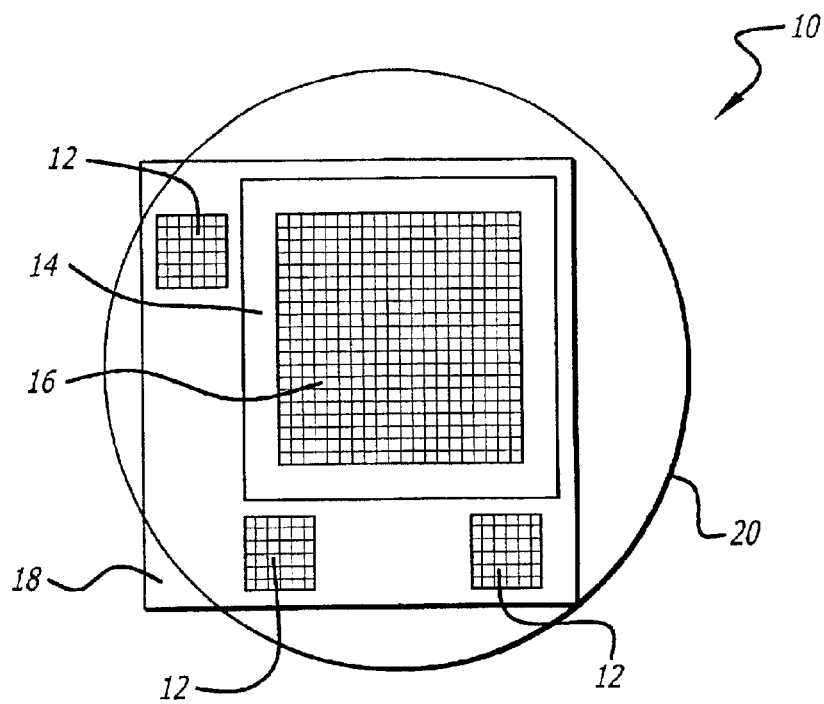
FIG. 1 is a diagram of a preferred embodiment of the present invention

FIG. 1 is a diagram of a preferred embodiment of the sensor 10 of the present invention. In accordance with the present teachings, three Uncooled Focus Detectors 12 are mounted adjacent to a Focal Plane Array 14 with an active detector area 16. In the preferred embodiment, the UFDs 12 are located on the Sensor Chip Assembly 10 on the Read Out Integrated Circuit (ROIC) 18 portion of the chip. The FPA 14 and the UFDs 12 are all mounted within the optical image area 20.

Figure 2:
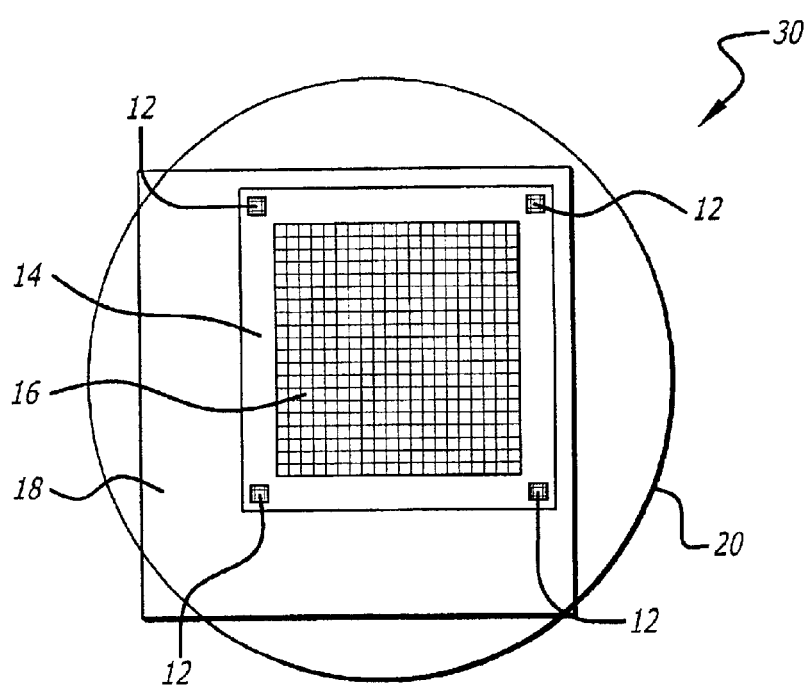
FIG. 2 is a diagram of an alternative embodiment of the present invention.

FIG. 2 is a diagram of an alternative embodiment 30 of the present invention. In this embodiment, four UFDs 12 are integrated into the FPA 14, in the corners adjacent to the active detector area 16. This embodiment is more desirable in theory than the preferred embodiment shown in FIG. 1 since the UFDs 12 are closer to the FPA 14. It is, however, more expensive to implement.

Figure 3:
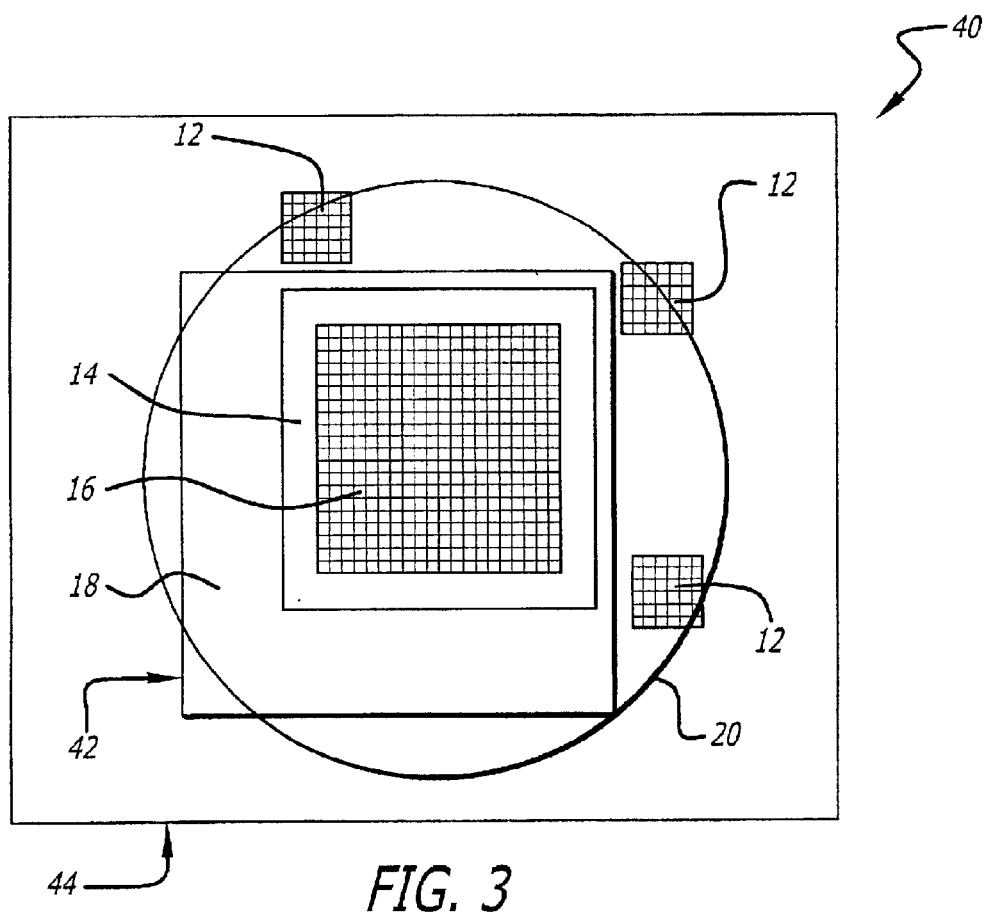
FIG. 3 is a diagram of a second alternative embodiment of the present invention.

FIG. 3 is a diagram of another alternative embodiment 40 of the present invention. In this embodiment, three UFDs 12 are placed adjacent to the Sensor Chip Assembly 42 on the motherboard 44. This embodiment is the least desirable in theory since the UFDs 12 are furthest from the FPA 14, but it is the least expensive to implement.

The UFDs 12 and the FPA 14 must be located in the same optical plane within the depth-of-focus required for the desired application. The depth-of-focus is about 3 $\mu$m for the visible range, 5 $\mu$m for medium wave, and 9–12 for short wave. The detectors will all stay within the focus plane if they are within these limits.

In the illustrative embodiments, the FPA 14 is a cooled detector array operable at cryogenic conditions. The SCA substrate can be made from mercury cadmium telluride (HgCdTe) or indium telluride (InTe or $In_2Te_3$). The invention, however, is not limited to the use of these materials. Any suitable material can be used for the substrate. The FPA 14 can be of any size (i.e. 128×128, 256×256, etc.).

In the illustrative embodiments, the UFDs 12 are 5×5 silicon-based detector arrays operable at ambient conditions. One possibility is to use microbolometers. In the preferred embodiment, the UFDs 12 are patterned into the ROIC 18.

Figure 4:
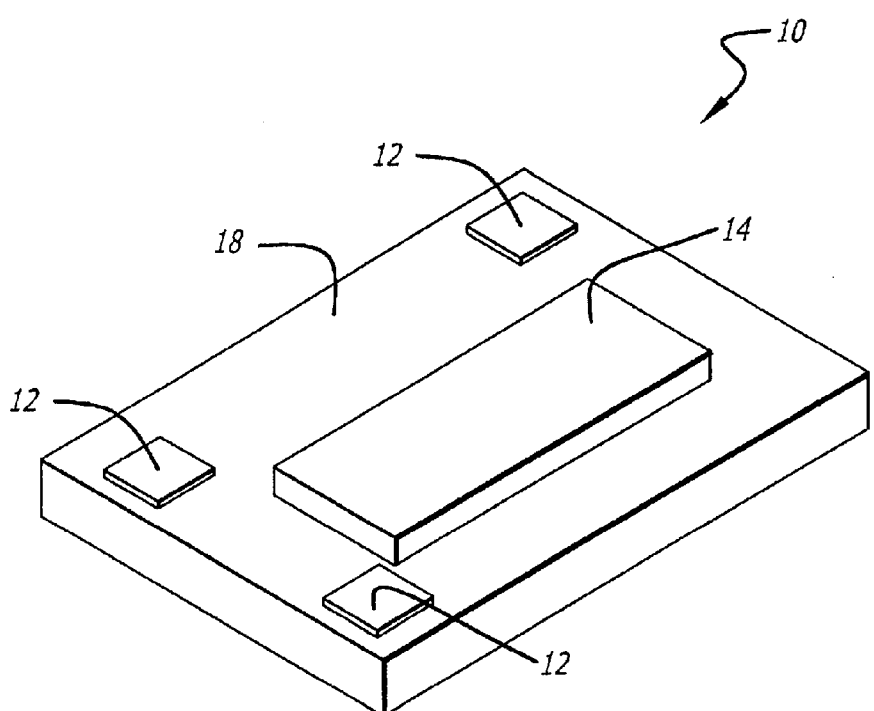
FIG. 4 is a three-dimensional view of a preferred embodiment of the present invention with uncooled focus detectors patterned into a readout integrated circuit.

FIG. 4 shows a three-dimensional view of the preferred embodiment of the present invention with the UFDs 12 patterned into the ROIC 18.

Figure 5A:
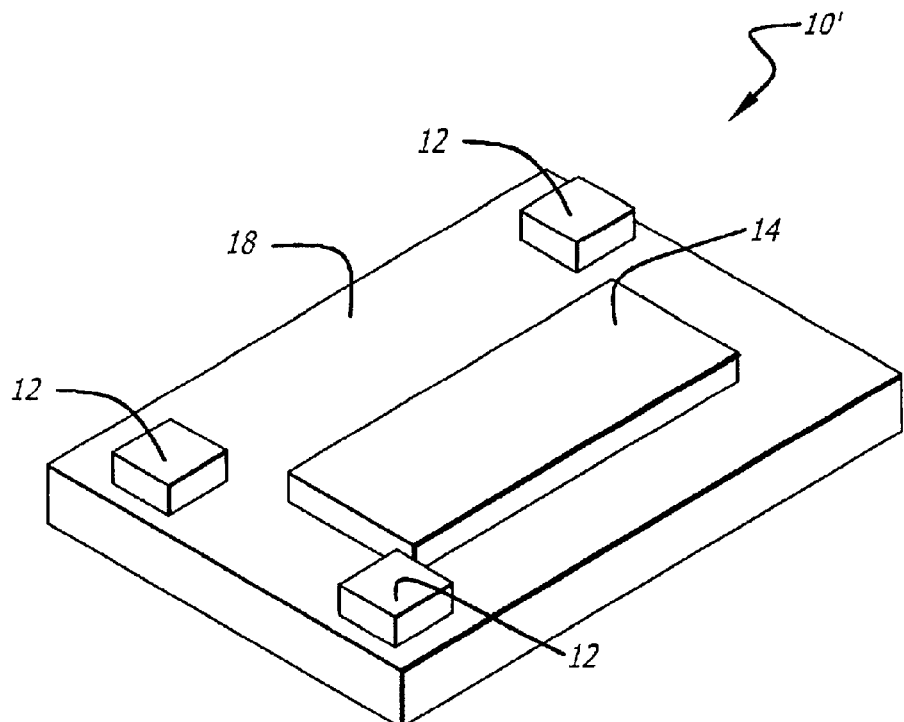
FIG. 5a is a three-dimensional view of an alternative embodiment of the present invention with stand-alone uncooled focus detectors bonded to the readout integrated circuit.
Figure 5B:
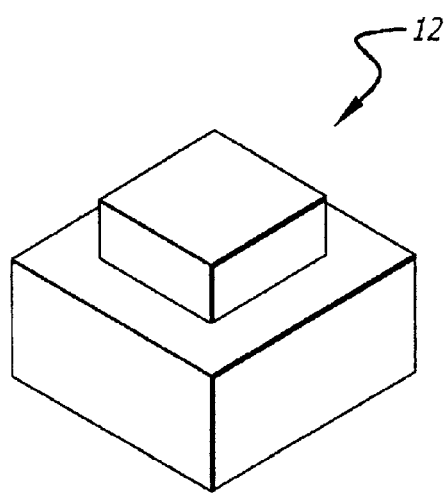
FIG. 5b is a three-dimensional view of a stand-alone uncooled focus detector utilized in the present invention.

In an alternative embodiment, the UFDs 12 are stand-alone chips bonded to the surface of the SCA 10. FIG. 5a is a three-dimensional view of this embodiment of the present invention with stand alone UFDs 12 bonded to the SCA 10. FIG. 5b is a three-dimensional view of a stand-alone UFD chip 12.

In the preferred embodiment, a multiplexer (MUX) is integrated into the ROIC to output the signals from the UFDs 12. Without a MUX, each UFD chip 12 would require N+1 output lines, where N is the number of elements in the UFD array (N=25 for a 5×5 array). A MUX can be used to reduce the number of data lines required.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A sensor for detecting electromagnetic energy comprising:

first means disposed in a first optical plane for detecting energy, said first means being operable when cooled to a first temperature range substantially below normal room ambient temperature and second means mounted in said first optical plane for detecting energy, said second means being operable uncooled.

2. The invention of claim 1 wherein said energy is infrared energy.

3. The invention of claim 1 wherein said energy is visible light.

4. The invention of claim 1 wherein said first temperature range is a range of cryogenic temperatures.

5. The invention of claim 1 wherein said first and second means are disposed on a common substrate.

6. The invention of claim 1 wherein said first means is a focal plane array.

7. The invention of claim 6 wherein said second means is a predetermined number of detector arrays.

8. The invention of claim 7 wherein said detector arrays are located near different corners of said focal plane array.

9. The invention of claim 1 wherein said sensor further includes a Read Out Integrated Circuit for outputting signals received from said first means.

10. The invention of claim 9 wherein said second means is patterned into said Read Out Integrated Circuit.

11. The invention of claim 9 wherein said sensor further includes third means for outputting signals received from said second means.

12. The invention of claim 11 wherein said third means is a multiplexer.

13. The invention of claim 12 wherein said multiplexer is patterned into said Read Out Integrated Circuit.

14. A sensor for detecting electromagnetic energy comprising:

a focal plane array operable when cooled to a cryogenic temperature;

a predetermined number of auxiliary detectors operable uncooled wherein said auxiliary detectors are adjacent to said focal plane array and in the same optical plane as said focal plane array; and a circuit for outputting signals received from said focal plane array and said auxiliary detectors.

15. A method for aligning a sensor including a focal plane array operable over a first temperature range with the focal plane of an optical system including the steps of:

adding auxiliary detectors operable over a second temperature range to said sensor adjacent to and in the same optical plane as said focal plane array, illuminating energy onto said sensor through said optical system at said second temperature range; and adjusting the position of said sensor until maximum illumination is received by said auxiliary detectors.

16. The invention of claim 15 wherein said method further includes calculating the location of the focal plane of the optical system at the first temperature range using said sensor position of maximum illumination in the second temperature range and a model of the thermal characteristics of the system.

* * * * *